UNITED STATES PATENT OFFICE.

PER GÖSTA EKSTRÖM, OF SKUTSKÄR, SWEDEN, ASSIGNOR TO STORA KOPPARBERGS BERGSLAGS AKTIEBOLAG, OF FALUN, SWEDEN, A CORPORATION OF SWEDEN.

METHOD OF REMOVING ORGANIC CONSTITUENTS FROM RESIDUES OBTAINED IN PRODUCING ALCOHOL FROM WASTE SULFITE CELLULOSE LYES OR SIMILAR LIQUIDS.

1,087,356.     Specification of Letters Patent.     Patented Feb. 17, 1914.

No Drawing.     Application filed March 24, 1911. Serial No. 616,727.

*To all whom it may concern:*

Be it known that I, PER GÖSTA EKSTRÖM, a subject of the King of Sweden, and resident of Skutskär, in the Kingdom of Sweden, have invented certain new and useful Improvements in the method of removing organic constituents from residues obtained in producing alcohol from waste sulfite cellulose lyes or similar liquids, of which the following is a specification.

In producing cellulose from wood according to the sulfite method the incrusting constituents of the wood are, as is well known to those skilled in the art, dissolved by the acid lye used, and further, a small percentage of the cellulose is inverted into saccharine matters which are also dissolved in the lye. The waste lye from the sulfite pulp process contains, therefore, about 50% of the wood mass in solution. For want of a technically and economically performable method of utilizing said liquor, the latter has hitherto in the most cases been drawn off as worthless after the separation of the cellulose. In such cases where a sufficient supply of running water is not present at the factory, special steps must be taken to prevent pollution of the water-course by the sulfite liquor drawn off. The steps taken for such purpose which have been successful consist in neutralizing the sulfite liquor by means of lime, and oxidizing by means of aeration. By such treatment the sulfite liquor is freed from its percentage of sulfurous acid, and, moreover certain resinous matters contained in the liquor are precipitated and may be separated from the liquor by filtration. After such treatment the liquor consists essentially of about 90% of water, about 1.5% saccharine matters dissolved in the liquor and about 8.5% of lignosulfonated lime and similar organic compounds likewise dissolved in the liquor. If the sulfite liquor thus treated is evaporated to a suitable thickness one obtains a lye which is very adhesive, and, therefore, may be used as a binding agent in manufacturing briquets and for similar purposes. Furthermore, the sulfite liquor may after neutralization with lime and aeration be utilized for producing alcohol by usual alcoholic fermentation of the saccharine matters contained therein. On the other hand all attempts to precipitate directly, *i. e.* without evaporation, the other organic constituents of the sulfite liquor which as stated above consist of lignosulfonated lime and similar organic compounds dissolved in the liquor, have hitherto been unsuccessful.

I have made the discovery that said organic matters of the waste lye originating from the ligneous substances of the wood, may be precipitated by means of basic agents, if the basic agent is added after the waste lye has undergone alcoholic fermentation and the alcohol has been distilled off. The cause of this surprising action of the basic agents in this case has not yet been ascertained, but it seems to have some relation to the chemical influence produced on the lye by the fermentation and the subsequent distillation.

The lye is first neutralized, in a well known manner, and the resinous matters of the lye are precipitated, the resulting liquid is then fermented and distilled, whereby the chief part of the saccharine matters is removed from the lye. By such operations about 15% of the total amount of organic matters in the lye is removed, and the remaining part of the organic matters in the lye, consisting essentially of ligno-sulfated lime (*Lignosulfonsaurer Kalk*) is more or less completely precipitated according to the present invention.

As precipitating agents in carrying out the invention inorganic as well as organic basic reagents may be used. Among the inorganic substances I prefer to use caustic lime; as an example of a suitable organic base anilin may be mentioned.

The invention may be most simply carried out in such manner that the waste lye is first fermented and the alcohol distilled off, whereupon caustic lime to a quantity of about 1% by weight of the lye is added to the latter. By such addition about 40% of the remaining percentage of organic matters in the lye is precipitated as a granular, brownish, humus-like mass, which may be separated from the lye by means of decantation or filtration. The product obtained in such manner is not hygroscopic and contains after the filtration only about 30% of water. By means of usual drying in the air it may be obtained practically free from water.

It is combustible and contains only about 15% ash constituents, principally lime, and it may, therefore, suitably be used as a fuel. The product may also be used as a raw-material for the purpose of producing other chemical compounds, such as dyes.

A still better result is obtained if the precipitation by means of a basic agent is combined with an aeration of the lye, which causes an oxidation of the organic matters of the lye, whereby the precipitation is increased in a surprising manner. The aeration may take place while the lye is in an acid or an alkaline condition; however, I have obtained the best results when the lye is maintained slightly alkaline during aeration. By the aeration the alkalinity of the lye is decreased and at the same time about 40% of the organic matters of the lye is precipitated in the same form as above described, so that in this manner about 80% of the organic matters of the lye may be recovered.

The oxidation of the lye takes place more easily and completely if the aeration is carried out in the presence of a catalyzer for promoting the oxidation of the lye, and any well-known catalyzer may be used. I have obtained good results by using manganese salts, for instance, sulfate of manganese, which latter substance may be used in a quantity of 5 to 10 kg. per 100 cu. m. of lye.

The aeration is suitably carried out at the temperature of the lye when it leaves the distilling apparatus, i. e. about 100° C., and is, when using large charges, completed in from 5 to 10 hours, the temperature decreasing during such treatment about 20° to 30° C.

The invention is not limited to the treatment of the waste lye resulting from the sulfite pulp process, but may also be used for treating other waste lyes obtained in producing alcohol by fermenting lyes obtained by boiling cellulose matters other than wood, for instance peat, with acid liquids.

I claim—

1. The method of separating organic matters from the waste lye of the sulfite pulp process and other similar lyes obtained in boiling cellulose containing materials in acid liquids; which comprises first producing alcohol from the lye in the well-known manner and then adding to the remaining lye a basic reagent, whereby the organic matters of the lye are more or less completely precipitated as a humus-like product.

2. The method of separating organic matters from the waste lye of the sulfite pulp process and other similar lyes obtained in boiling cellulose containing materials in acid liquids; which comprises first producing alcohol from the lye in the well-known manner and then adding to the remaining lye caustic lime, whereby the organic matters of the lye are more or less completely precipitated as humus-like lime compounds.

3. The method of separating organic matters from the waste lye of the sulfite pulp process and other similar lyes obtained in boiling cellulose containing materials in acid liquids; which comprises first producing alcohol from the lye in the well known manner, then adding to the remaining lye a basic reagent, and oxidizing the lye, substantially as and for the purpose set forth.

4. The method of separating organic matters from the waste lye of the sulfite pulp process and other similar lyes obtained in boiling cellulose containing materials in acid liquids; which comprises first producing alcohol from the lye in the well known manner, then adding to the remaining lye a basic reagent, and aerating the lye, substantially as and for the purpose set forth.

5. The method of separating organic matters from the waste lye of the sulfite pulp process and similar lyes obtained in boiling cellulose containing material in acid liquids, which comprises first producing alcohol from the lye in the well known manner, then adding to the remaining lye a basic reagent and aerating the lye in the presence of an oxidizing catalyzer, substantially as and for the purpose set forth.

In witness whereof, I have hereunto signed my name in the presence of two subscribing witnesses.

PER GÖSTA EKSTRÖM.

Witnesses:
   AXEL ELMER,
   HEDWIG MELINDER.